United States Patent [19]

McCauslan, George L. et al.

[11] 4,056,450
[45] Nov. 1, 1977

[54] CONTINUOUS DETINNING SYSTEM

[75] Inventors: George L. McCauslan, Jamesburg; Donald B. Read, Colts Neck, both of N.J.

[73] Assignee: M & T Chemicals Inc., Greenwich, Conn.

[21] Appl. No.: 696,642

[22] Filed: June 16, 1976

Related U.S. Application Data

[62] Division of Ser. No. 591,891, June 30, 1975.

[51] Int. Cl.$^2$ ............................ C25F 7/00; C25F 5/00
[52] U.S. Cl. ................................... 204/201; 204/121; 204/213
[58] Field of Search ............................ 204/120–122, 204/199–201, 213, 212

[56] References Cited

U.S. PATENT DOCUMENTS

| | | | |
|---|---|---|---|
| 1,912,400 | 6/1933 | O'Neill | 204/201 |
| 1,997,458 | 4/1935 | Ehrhardt | 204/201 |
| 2,655,473 | 10/1953 | Lowenheim | 204/121 |

FOREIGN PATENT DOCUMENTS

| | | | |
|---|---|---|---|
| 155,214 | 12/1938 | Austria | 204/201 |
| 2,165,614 | 1/1973 | Germany | 204/201 |
| 7,032,604 | 8/1966 | Japan | 204/201 |
| 327,997 | 4/1930 | United Kingdom | 204/121 |
| 138,120 | 5/1960 | U.S.S.R. | 204/201 |

Primary Examiner—F.C. Edmundson
Attorney, Agent, or Firm—Kenneth G. Wheeless; Robert P. Auber; Robert Spector

[57] ABSTRACT

This invention relates to the recovery of tin as tin metal from tin plate scrap on a continuous basis comprising continuously advancing shredded scrap through an electrically anodic rotating perforated drum partially but not completely immersed in a caustic solution containing no oxidizing agents, plating the tin content of said tin plate scrap upon cathodes disposed obversely and externally to said electrically anodic rotating drum arranged in a longitudinal row on the inside wall of a tank containing said caustic solution.

15 Claims, 4 Drawing Figures

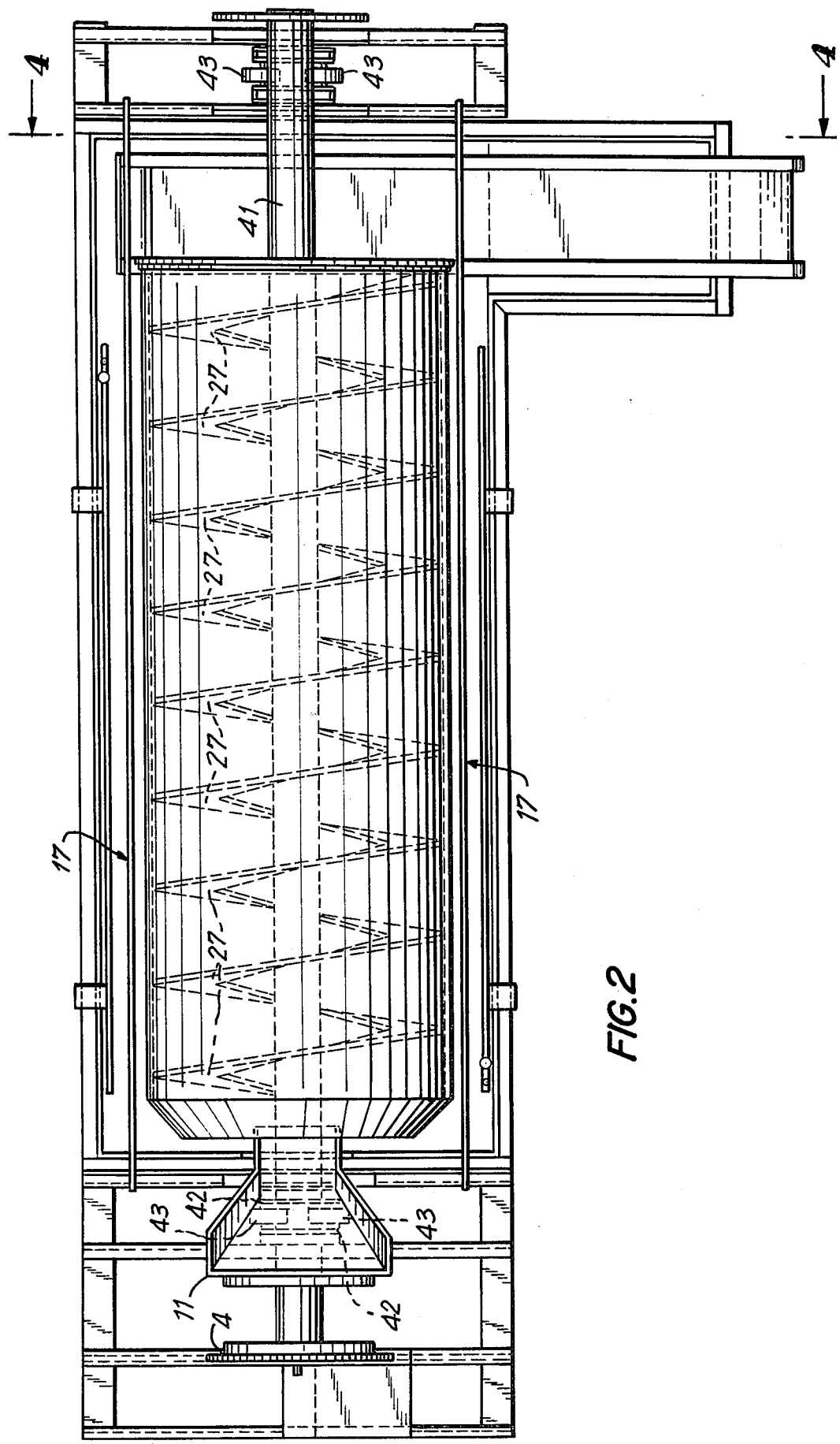

CONTINUOUS DETINNING SYSTEM

This is a divisional of application Ser. No. 591,891, filed June 30, 1975.

FIELD OF THE INVENTION

This invention relates to new and useful improvements in apparatus and method for the continuous removing of tin from tinplate scrap and the like, especially tin plated cans.

BACKGROUND OF THE INVENTION

For many years it has been the practice to remove tin from scrap tinplate by various processes in order to recover the tin and also the steel scrap on which the tin is coated. One such method employs an oxidizer and is widely used commercially. At the present time the conventional method of detinning scrap is to load the same into large perforate drums which are lowered into a series of vats containing various solutions. The scrap is subjected to treatment in each vat in the series and this involves first lowering the drum into the vat and then, after a sufficient time has elapsed for completion of the action, hoisting the drum and conveying the same to the next vat in order. Commercial plants employing the foregoing process are huge, expensive installations which handle large batches and require for efficient operation a very extensive source of scrap. Transportation of scrap to the detinning plant is an important factor in the cost of raw materials and many areas in which scrap is at present accumulated cannot dispose of scrap for detinning purposes because of geographic remoteness from the detinning plant and the fact that sufficient scrap is not accumulated in the area to justify the erection of a new plant.

The present invention involves the use of apparatus hereinafter described which is equipped to handle scrap tinplate in a continuous process and which does not require the lifting of drums from one vat to another. Thus the present invention avoids the expensive, cumbersome equipment which is conventional in detinning plants.

SUMMARY OF THE INVENTION

This invention comprises the recovery of tin as tin metal from tinplate scrap on a continuous basis comprising continuously advancing shredded scrap through an electrically anodic rotating perforated drum partially but not completely immersed in a caustic solution in the absence of oxidizing agents, plating the tin content of said tinplate scrap upon a plurality of cathodes disposed obversely and externally to said electrically anodic rotating drum arranged in a longitudinal row on the inside wall of a tank containing said caustic solution.

Another aspect of this invention is in an apparatus for the recovery of tin as tin metal from tinplate scrap, the combination of a revolving anodic perforated drum having an opening at one end of receiving material, contact means for rendering said drum anodic, a central shaft inside said drum, drive means revolving said drum, helical means interposed between said drum and said cylinder said means dividing the annular zone between said drum and said cylinder into a plurality of flights, each accommodating a quantity of scrap, said helical means being arranged to advance said scrap from the intake end of said drum to the discharge end thereof, a tank for caustic solution in which said drum is partially submerged, a plurality of cathode plates obversely and externally to said electrically anodic rotating drum arranged in a longitudinal row on the inside wall of said tank containing said caustic solution.

The system can be divided into a feed system, a detinning system and a discharge system. In the feed system, the scrap is collected in a vibrating hopper which shakes the scrap onto a vibrating pan that leads to a feed conveyor which introduces the scrap into the drum by means of a feed chute.

The detinning system consists of a drum rotated by means of a center shaft which is partially immersed in a tank containing a solution of 6% caustic at 82.2° C. Welded inside the drum is a spiral which transports the scrap through as the drum rotates. At each end of the center shaft is a copper plate where the anode connections are made. Submerged in the tank along the entire length on both sides of the drum are the steel cathodes. The cathodes are bolted to a copper bus bar running along the tank above the solution. The tin is plated out on the steel plates.

The discharge system consists of a conveyor situated in the tank under the drum level just at the end of the drum. The conveyor catches the scrap as it is dumped and carries it out of solution where it is spray washed and collected.

The scrap spends an average of 18 to 70 minutes in the drum and is detinned when discharged.

The present invention involves the use of tinplate scrap continuously and violently agitated, with the result that the detinning solution contacts all of the coated surfaces of the scrap and has an opportunity to remove al of the tin. The resultant steel scrap is substantially free of tin, which makes the scrap of greater value to a steel mill. Further, the recovery of tin is higher. The apparatus which is involved in the use of the present invention comprises a single revolving perforate drum which is suspended and rotated in a tank so that the lower half of the drum which contains the scrap is at all times immersed in liquid. A plurality of helical flights or passageways is provided inside the perforate drum. The scrap tinplate is fed into one end and then scrap is carried forward upon revolution of the drum to the opposite end where it is drained of liquid and deposited in a hopper.

DESCRIPTION OF THE DRAWINGS

The invention will be more fully understood from the following detailed description taken in view of the accompanying drawings in which

FIG. 2 is a top plan;

Figure 1:
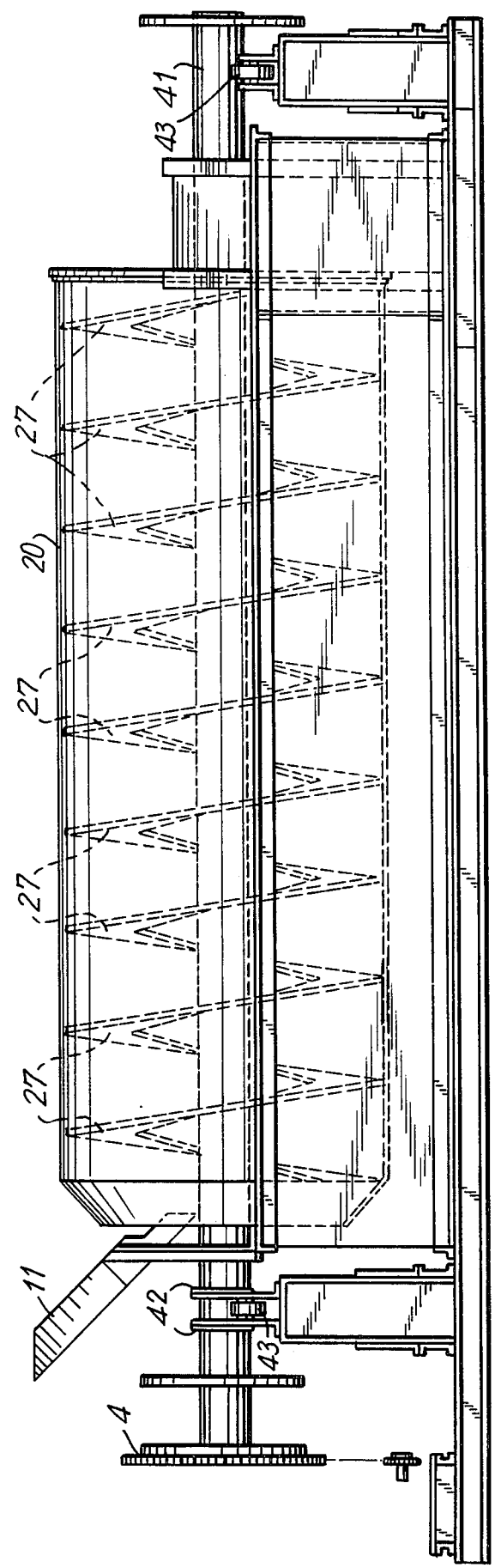
FIG. 1 is a longitudinal vertical section through the apparatus illustrating the same in a more or less diagrammatic way.
Figure 3:
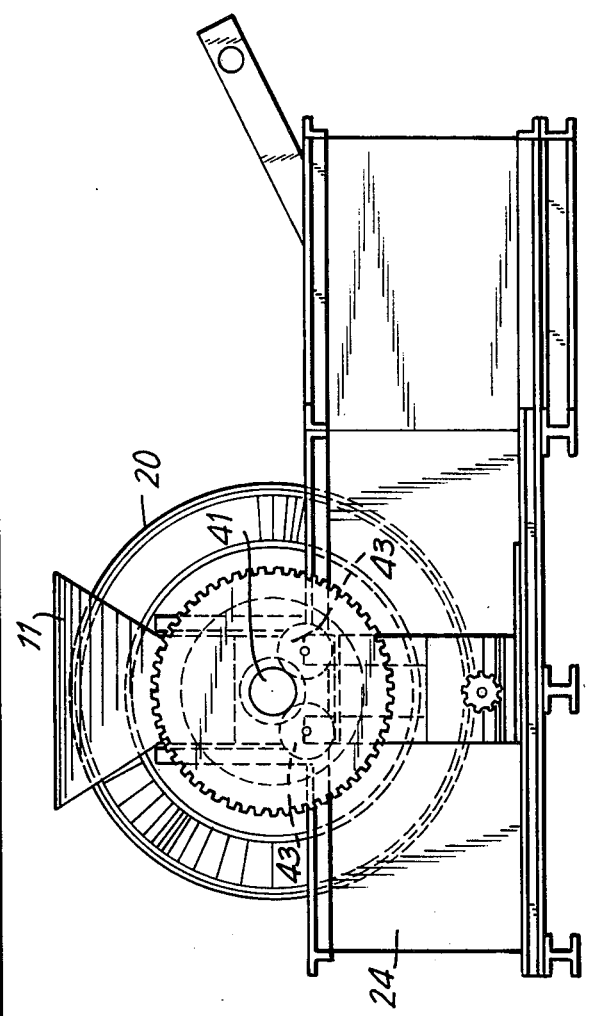
FIG. 3 is an end elevation of the drum viewed from the inlet end.
Figure 4:
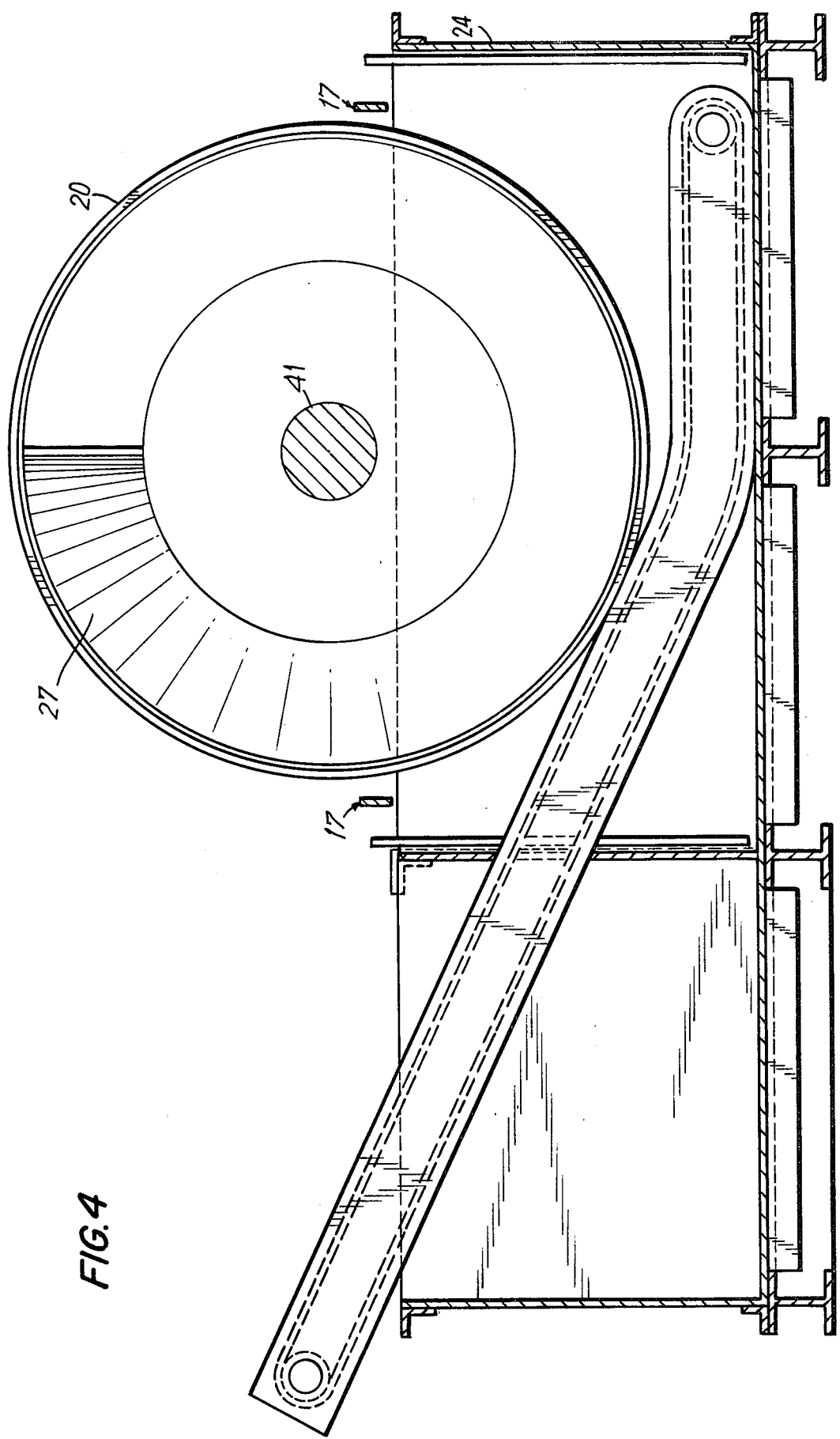
FIG. 4 is an end elevation of said drum viewed from the discharge end.

An aspect of this invention is an apparatus for the continuous detinning of tin plate scrap comprising a vibrating storage hopper for holding a quantity of said tin plate scrap; a vibrating pan 10 with control to receive increments of said tin plate scrap; a feed conveyor 9 to convey said increments of tin plate scrap from said vibrating pan to a feed chute 11 having a discharge opening at its lower end, a hollow foraminous cyclinder 20 rotatably mounted beneath the chute 11 closely adjacent thereto, the wall of the cylinder closing the discharge opening of the chute, a central cylinder 41 inside said hollow foraminous cylinder 20 extended on both ends to insulated roller supports 42 and timing drive sprocket 43, a plurality of helical members 27 interposed between said hollow foraminous cylinder 20 and said central shaft forming a plurality of helical shaped flights, said helical members 27 being arranged to advance said scrap through said hollow foraminous cylinder 20 from the inlet end portion to the outlet end portion thereof; a tank 24 for liquid in which said hollow foraminous cylinder 20 is partially submerged, a plurality of steel plates 16 arranged in longitudinal rows external to said hollow foraminous cylinder 20 said steel plates 16 suspended from a bus bar 17 cathodically connected to a power source. The locating rings 42 rest and are circumferentially supported upon insulated roller supports. The cylindrical central shaft 41 is thus journaled in the roller supports 43.

The apparatus which is the subject of this invention comprises a slowly revolving perforate drum 20 suspended in a tank containing a chemical solution. White scrap, this term being used to denote unprocessed tinplate scrap and the like, is charged into the drum. During the course of the processing, the tin coating is dissolved, leaving uncoated steel scrap, hereinafter termed black scrap. The black scrap is discharged and may be employed by steel mills. Generally the white scrap is received at the plant in cars from which a small crane loads it into the hopper 10 then into trough 11 which feeds the intake end of the drum 20. Each hopper 10 is loaded with a weight of white scrap corresponding to the weight of the compressed bundle of black scrap which is transmitted to the steel mill after processing.

The anodic drum 20 adjacent the intake end of the plant is supported in a tank 24, said tank being set on suitable foundations. The structure may have overlying cover and surrounding side walls and end walls which exclude air and insulate against heat loss. The tank 24 may be formed by a continuous longitudinal curved bottom. The length of the tank 24 and drum 20 suspended therein may vary.

The drum includes an inner, small diameter cylinder 41 concentric with the axis of rotation of the drum 20, which is substantially cylindrical. As the scrap passed from stage to stage it shifts position to a radially aligned position or even completely turns over. The turning movement greatly improves the effectiveness of the detinning process because it results in agitation of the scrap and insures that all surfaces are exposed to the chemical actions which take place in the drum.

Between the inner cylinder and the outer casing 20 are a plurality of helical separators which divide the annular zone between the inner cylinder and the outer casing into a corresponding number of separate passageways. Thus, scrap dumped in the flight between two of the radially extending separator members 27 is kept separate from contact with scrap deposited in the other flights. The separator members 27 travel the scrap from the intake end 43 to the outlet ends. The agitation and realignment of position of the scrap occurs which enhances chemical action. During this passage through the drum, the scrap is kept separated from scrap deposited in the other passageways and thus there is no tangling or mingling of the scrap.

By reason of the perforate structure of the outer casing 20, the scrap is subjected to the action of the liquid in the tank in which the drum is immersed throughout the entire time or passage through the intake end of the drum. When the scrap reaches the discharge end 45, the scrap falls out and onto a conveyor which connects with the ramp at the intake end of a hopper.

The tank in which the drums are immersed may be heated by means of steam coil panels and provision is made for pumping fresh liquid into the tanks and removing spent liquid for processing, reconcentration, filtering and the like. It will be seen, however, that heat losses are minimized by reason of the fact that it is never necessary to remove any cover in order to hoist a drum out of the tank as is required in conventional processes.

The rotating drum 20 is driven and suspended by novel means. About the circumference of each end of the drum is a pair of channels and under each channel 43 is a pair of wheels and this supports the weight of the drum 20. The drum 20 is power driven through a gear drive from an electric motor. The speed of rotation of the drum 20 varies with the function of each apparatus in the process.

An illustrative small unit may consist of a perforated metal drum 5 feet in diameter by 15 feet long, supported by an 8 inch diameter shaft running through center of drum. Perforated spirals, 12 inches high on 18 inch pitch distance, run through length of drum with support bars welded to edge of spirals and center shaft.

The drum is arranged to rotate in a steel tank with a maximum width of 7 feet, 0 inches.

The center shaft of drum is extended on both ends to insulated roller supports and timing drive sprockets on one end only with carbon brush contactors and supports at each end sized for 1000 AMP to 60,000 AMP capacity. A steel belt conveyor is located at discharge end to remove scrap from open end of drum.

Two copper bus bars ½ inch thick by 3 inches deep run parallel along each side of the drum. Each end of the bus bars is supported on the flange of tank with intermediate supports to maintain stability. Supports are fabricated from wood or other suitable material to provide electrical insulation from the tank.

Twenty carbon steel cathode plates hang along entire length of drum from the bus bars.

A steel scrap charge chute 11 is provided. Chute 11 may be installed to enter drum through open top half at end of drum. It should be supported from tank and shall be designed for easy removal.

The apparatus is provided with a variable speed drive, sheaves, sprocket, and cog belt or chain. The drive unit is electrically insulated from drum shaft.

Scrap, such as tinplate clippings and the like, is loosely packed in the form of sized fragments and pieces in drum is continuously moved or agitated in the bath through rotation of the drum. During passage of the current from the anode to the cathodes, the scrape acts as a bipolar electrode. According to the principle of bipolar electrodes, although the scrap is not directly connected in the electric circuit, it yet serves to conduct current. This is because the resistance to the current offered by the scrap is less than that offered by the solution intermediate the anode and the cathodes, and hence at least some current will tend to flow through the scrap.

As indicated above, the bath comprises an aqueous solution of caustic alkali, such as sodium hydroxide and/or potassium hydroxide, and such alkali may vary in concentration from about 1% to as high a concentration as that in which sodium stannite is substantially soluble. A preferred concentration range is about 3 to about 20% for sodium hydroxide and about 1 to about 40% for potassium hydroxide, with a concentration of about 5% for either material being specially useful. Sodium hydroxide, being less expensive, is the preferred alkali. Some, but not all, of these alkalis may be replaced by potassium pyrophosphate and sodium pyrophosphate.

The cylindrical foraminous rotatable anode should be insoluble in the bath. Steel is the preferred material, although other materials which do not dissolve in the caustic alkali solution are useful, such as nickel, nickel-plated iron, cobalt, cobalt-plated iron, iron plated with nickel and cobalt, platinum and other noble metals, graphite, silver, and iron alloys such as duriron, stainless steel, etc. The cathodes may be of any suitable metal, the most common metals being iron or tin. Any variety of tinplate scrap is suitable for detinning.

The following examples illustrate the operation of the above described method and apparatus.

The unit unexpectedly detins and plates out tin simultaneously with a high current efficiency in a relatively short time without chemicals consumption. The results show that the unit generally detins to below the maximum allowed level of tin. Certain samples of heavily lacquered scrap gave results slightly higher than the acceptable value but these occurrences were few in number. Overall the detinned scrap was quite good.

The drum was mounted in a tank containing a 6% caustic solution which is heated to 82.2° C. As the drum rotated the scrap tumbled below the solution level preventing the tin surfaces from continually touching but allowing contact with the drum causing the scrap to become anodic and to oxidize the tin to stannite. As this is occurring the stannite just formed is effectively reduced to tin metal at the cathode.

Some advantages of this system as compared to a conventional system are as follows.

1. The raw material requirements are lower. The caustic used in dissolving the tin is recovered when it is plated out. No oxidizing agent is necessary.
2. The unit operates at a lower temperature than either detinning or plating.
3. The electrical efficiency is greater since tin is effectively plated from tin (11) and not tin (IV) and both the anode and cathode have important roles. In conventional plating, the anode has no real function except to complete the cell.
4. Being a continuous system there is no need for solution transfer.
5. The residence time of 18 minutes is much shorter than a conventional system.

The expected efficiencies were obtained. In the beginning, with no tin in solution, the anode current efficiency (detinning efficiency) approached 100% on the basis of tin metal to tin (II) and the cathode current efficiency (plating efficiency) was very low. After the tin built up to 0.5%, the anode and cathode current efficiencies were equal. At that point in time, the operating amperage used (600 amperes) were above the theoretical amount of 460 amperes for scrap at 0.34% tin. This means that a maximum efficiency of 77% could be obtained. The extra current was used in case the tin content of the scrap being processed increased 30% higher.

The operating parameters depend on the unit (feed rate) and the chemistry of the system (Temperature, retention time, current, % caustic) e.g. a minimum temperature of 82.2° C., a minimum caustic concentration of 6% and 20 minute retention time. It was found from Runs 2 and 3 in Table I that a 5% caustic concentration gave good detinning and from Runs 4 and 5 that 80° C. gives good detinning. However, operation with 6% caustic and 82.2° C. gave better attack on the paints and lacquers present.

TABLE I

| Run No. | Lbs. | % Sn Black Scrap | Feed Rate (#/Min.) | Temp. °C. | Retention Time (Min.) | Current (Amp) | Caustic % |
|---|---|---|---|---|---|---|---|
| 1 | 500 | 0.023 | 5.3 | 76.1 | 30 | 600 | 5 |
| 2 | 600 | 0.043 | 8 | 74.4 | 28 | 400 | 5 |
| 3 | 740 | 0.033 | 6.2 | 76.6 | 28 | 400 | 6 |
| 4 | 450 | 0.023 | 11 | 80.0 | 19 | 400 | 6 |
| 5 | 480 | 0.030 | 10.7 | 92.2 | 18 | 400 | 6 |
| 6 | 540 | 0.087 | 13 | 79.4 | 10 | 800 | 6 |
| 7 | 300 | 0.036 | 10.7 | 86.6 | 19 | 600 | 6 |
| 8 | 580 | 0.012 | 12.3 | 85.0 | 19 | 600 | 6 |
| 9 | 480 | 0.044 | 10.7 | 83.3 | 19 | 600 | 6 |

The retention time necessary can be found by comparing Runs 3, 4 and 6. The shortest retention time found that gives satisfactory detinning is 18 minutes.

The amperage to be used depends on the following factors: feed rate, maximum current efficiency and % tin on the scrap. Since the feed rate is determined and the maximum current efficiency is a constant of the unit, the amperage used must account for the highest % tin on the scrap. Although an amperage as low as 400 at the 18 minute feed rate gave satisfactory detinning, an amperage of 600 was used in the extended runs to account for any tinplate scrap that might be obtained.

Unless noted differently, all runs were made under the conditions determined in the preliminary runs. The variation in Run 12 was an attempt to get better lacquer attack. All other variations were done to improve the adherence of the tin to the cathode surface.

TABLE II

| Run No. | Lb./Run | 1000 Amp Hr. | KWH | % Sn Black Scrap | Remarks |
|---|---|---|---|---|---|
| 10 | 15840 | 15.16 | 25.64 | 0.038 | |
| 11 | 10680 | 10.03 | 16.76 | 0.029 | Free NaOH kept at 6% for all runs. |
| 12 | 10770 | 10.52 | 18.41 | 0.020 | 0.1% butyl carbitol. |
| 13 | 12560 | 11.76 | 23.50 | 0.040 | |
| 14 | 11600 | 9.91 | 25.75 | 0.053 | Removed ½ cathodes. |
| 15* | 17800 | 15.66 | 44.45 | 0.048 | |
| 16* | 9400 | 10.58 | 26.45 | 0.046 | 750 amps Removed ½ cathodes |
| 17* | 12300 | 35.54 | 151.0 | 0.058 | 1500 amps |
| 18* | 11500 | 28.73 | 122.1 | 0.056 | 1500 amps 98.8° C. |
| 19* | 14900 | 31.98 | 135.9 | 0.057 | 1500 amps |
| 24* | 66800 | 62.32 | 124.6 | 0.044 | |
| TOTAL | 194150 | | | 0.0447 | |

*Straight cathodes used.

With this maximum efficiency of 77%, an efficiency of 67% was obtained. This is calculated from tin introduced less the tin left on the scrap divided by the theoretical tin off (amp-hr./205) on the basis of tin to tin (II).

The basic advantages of the novel continuous electrolytic detinning unit over a conventional unit are:
1. Lower chemical usage.
2. Lower energy usage.
3. Less Mechanical equipment.
4. Faster detinning time.

A conventional system uses up about 18 to 20 lbs. NaOH and 9 to 12 lbs. NaNO$_3$ per ton of scrap in addition to any losses in the transferring and precipitating the stannate cake. At present, these values are not recovered after plating the tin out. In the electrolytic system of this invention, all caustic values are simultaneously recovered upon plating and no nitrate is used.

The electrolytic unit operates at a lower temperature (82.2° C.) than the conventional system (104.4° C.). In addition there is no extra electrowinning procedure. The electrical usage in this electrowinning procedure is high with low efficiencies while the electrolytic unit has high efficiencies mainly since it plates out from tin (II) and not tin (IV).

Although this invention has been illustrated by reference to specific embodiments, modifications thereof which are clearly within the scope of the invention will be apparent to those skilled in the art.

We claim:

1. In an apparatus for the recovery of tin as tin metal from tin plate scrap, the combination of a revolving anodic perforated drum having an opening at one end for receiving material, contact means for rendering said drum anodic, a central cylinder inside said drum, drive means for revolving said drum, helical means interposed between said drum and said cylinder, said means dividing the annular zone between said drum and said cylinder into a plurality of flights, each accommodating a quantity of scrap, said helical means being arranged to advance said scrap from the intake end of said drum to the discharge end thereof, a tank for bath solution in which said drum is partially submerged, a plurality of cathode plates obversely and externally to said electrically anodic rotating drum arranged in a longitudinal row on the inside wall of said tank containing said bath solution.

2. The apparatus according to claim 1 further including heating panels in said detinning tank.

3. The apparatus according to claim 1 further including copper bus bars from which said cathodes are suspended and electrically contacted.

4. The apparatus according to claim 1 further including level control means to maintain a predetermined level of bath solution in said tank.

5. The apparatus according to claim 1 further including a tank and pump to adjust said bath level for evaporation losses.

6. The apparatus according to claim 1 further including means for controlling a spray wash for said detinned scrap.

7. The apparatus according to claim 1 further including means to contain discharged detinned scrap.

8. The apparatus according to claim 1 wherein said central cylinder is extended on both ends to insulated roller supports and timing drive sprocket.

9. An apparatus for the continuous detinning of tin scrap comprising a vibrating storage hopper for holding a quantity of said tin scrap; a vibrating pan with control to receive increments of said tin scrap; a feed conveyor to convey said increments of tin scrap from said vibrating pan to a feed chute having a discharge opening at its lower end, a hollow foraminous anodic cylinder rotatably mounted beneath the hopper closely adjacent thereto, the wall of the cylinder closing the discharge opening of the hopper, a central cylinder inside said hollow foraminous cylinder extended on both ends to insulated roller supports and timing drive sprocket, a plurality of helical members interposed between said hollow cylinder and said central cylinder forming a plurality of helical shaped flights, said helical members being arranged to advance said scrap through said hollow foraminous cylinder from the inlet end portion to the outlet end portion thereof; a tank for liquid in which said hollow foraminous cylinder is partially submerged, a plurality of plates arranged in longitudinal rows external to said hollow foraminous cylinder said plates cathodically connected to a rectifier connected in circuit with said foraminous anodic cylinder, means for removing detinned scrap from said tank as said scrap discharges from said hollow foraminous cylinder.

10. The apparatus according to claim 9 further including means for supplying tin plate can scrap to said vibrating storage hopper.

11. The apparatus of claim 9 wherein said outlet end of said foraminous cylinder is arranged to terminate over a discharge conveyor conveying said scrap from said outlet end of said foraminous cylinder through a controlled spray wash to a hopper to collect discharged detinned scrap.

12. The apparatus of claim 9 further includes scraper means to remove tin metal from said plurality of cathodes.

13. The apparatus according to claim 9 further including a mobile tank to collect tin metal.

14. In a plant for the continuous recovery of tin as tin metal from tin plate scrap comprising in a sequence of treatment stages means for storing tin plate scrap, means for conveying said tin plate scrap, chute means for said tin scrap, to a revolving anodic perforated drum having an opening at one end for receiving material, contact means for rendering said drum anodic, a central cylinder inside said drum, drive means for revolving said drum, helical means interposed between said drum and said cylinder, said means dividing the annular zone between said drum and said cylinder into a plurality of flights, each accommodating a quantity of scrap, said helical means being arranged to advance said scrap from the intake end of said drum to the discharge end thereof, a tank for bath solution in which said drum is partially submerged, a plurality of cathode plates obversely and externally to said electrically anodic rotating drum arranged in a longitudinal row on the inside wall of said tank containing said bath solution, conveying means for detinned scrap and storage means for said detinned scrap.

15. A plant for the continuous detinning of tin plate scrap comprising a vibrating storage hopper for holding a quantity of said tin scrap; a vibrating pan with control to receive increments of said tin scrap; a feed conveyor to convey said increments of tin scrap from said vibrating pan to a feed chute having a discharge opening at its lower end; a hollow foraminous cylinder rotatably mounted beneath the hopper closely adjacent thereto, the wall of the cylinder closing the discharge opening of the chute; a central cylinder inside said hollow foraminous cylinder extended on both ends to insulated roller supports and timing drive sprocket; a plurality of helical members interposed between said hollow cylinder and said central cylinder forming a plurality of helical shaped flights, said helical members being arranged to advance said scrap through said hollow foraminous cylinder from the inlet end portion to the outlet end portion thereof; a tank for a bath solution in the absence of oxidizing agents in which said hollow foraminous cylinder is partially submerged; a plurality of cathodes arranged in a longitudinal rows external to said hollow foraminous cylinder, said cathodes being substantially concentric with said hollow foraminous cylinder and said central cylinder, said tank containing heating panels and a continuous conveyor disposed beneath the discharge end of said hollow foraminous cylinder to continuously convey detinned scrap longitudinally and upwardly out of said tank at an angle to the vertical of said tank, said conveyor extending beyond the extremity of said tank; means for spray washing that portion of said conveyor and said detinned scrap extending beyond the extremity of said tank, and hopper means to collect detinned scrap from said conveyor.

* * * * *